Oct. 30, 1928.

W. B. WELLS 1,689,655

LIGHT SIGNAL

Filed March 20, 1925

2 Sheets-Sheet 1

INVENTOR:
W. B. Wells,
BY A. L. Vencill
His ATTORNEY

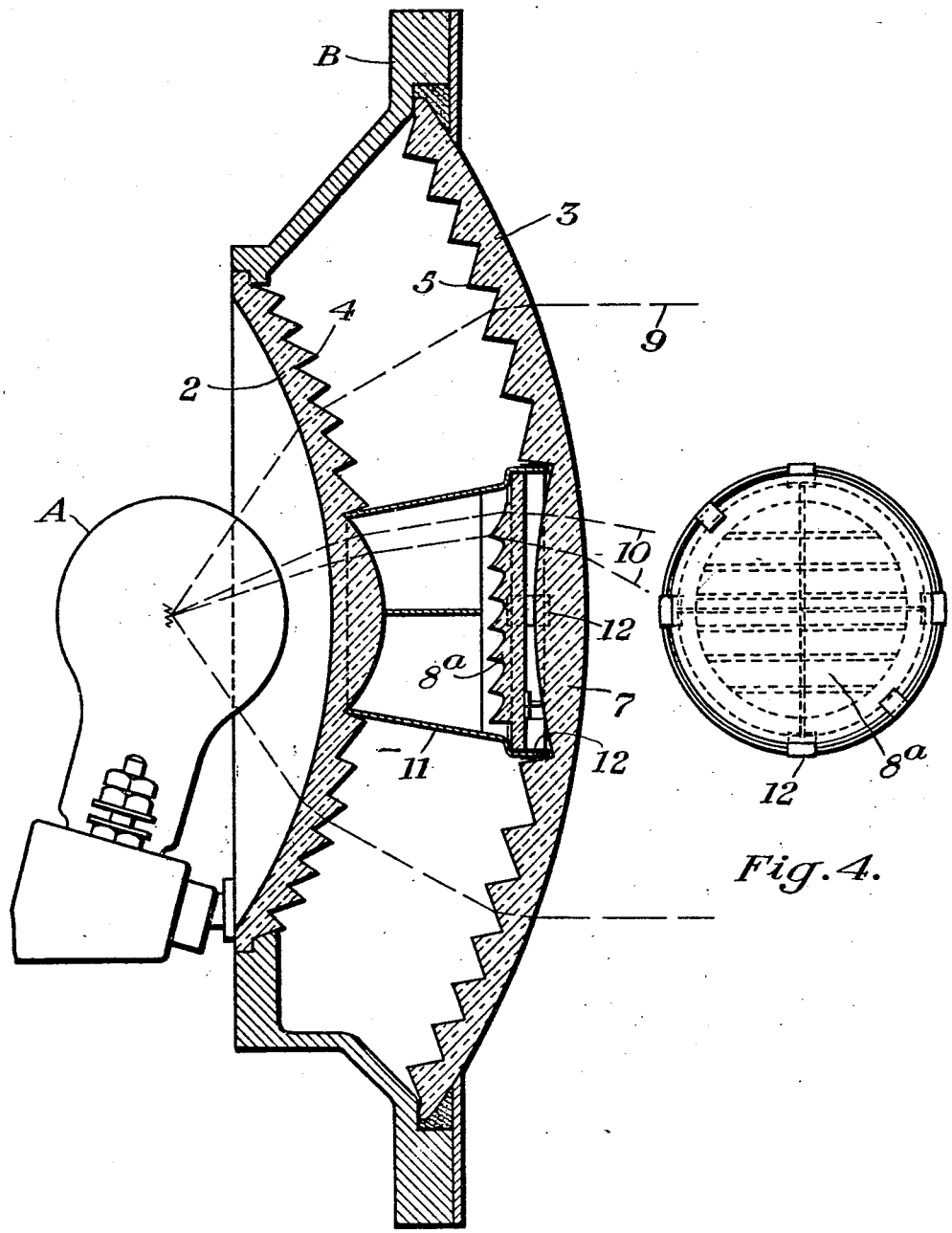

Patented Oct. 30, 1928.

1,689,655

UNITED STATES PATENT OFFICE.

WESLEY B. WELLS, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

LIGHT SIGNAL.

Application filed March 20, 1925. Serial No. 17,032.

My invention relates to light signals for railways, that is, to signals of the type comprising a source of light and optical means including an echelon lens for projecting a beam of parallel rays from such source to a distant point.

One feature of my invention is the provision of means associated with the echelon lens for projecting a portion of the rays from the light source downwardly to produce an indication to an observer close to the signal.

I will describe two forms of light signals embodying my invention, and will then point out the novel features thereof in claims.

Figure 2:
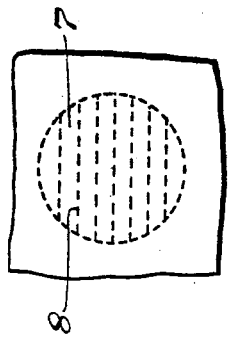
Figure 1:
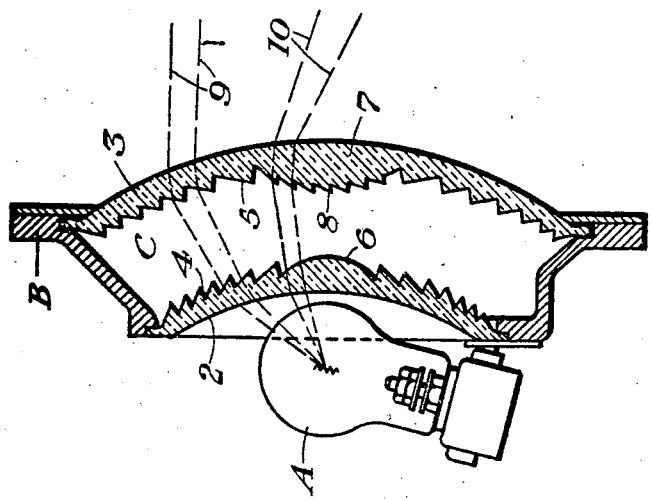

In the accompanying drawings, Fig. 1 is a vertical sectional view showing one form of light signal embodying my invention. Fig. 2 is a front view of the central portion of bull's-eye of the outer lens 3 of the signal shown in Fig. 1. Fig. 3 is a vertical sectional view showing a modified form of light signal embodying my invention. Fig. 4 is an end view of a prismatic screen and supporting tube therefor forming part of the signal shown in Fig. 3.

Similar reference characters refer to similar parts in each of the views.

Referring first to Figs. 1 and 2, the signal comprises a frame or housing B supporting a source of light A, which, as here shown, is an electric incandescent lamp. The frame or housing B also supports a doublet C made up of two echelon lenses 2 and 3, arranged to project a beam of substantially parallel rays 9 from the lamp A to a distant point. The steps 4 of the inner lens 2 are located on the outer surface of this lens, whereas the steps 5 on the outer lens 3 are located on the inner surface of this lens. The inner lens 2 is provided with the usual bull's-eye or central lenticular portion 6, and the outer lens 3 is likewise provided with the usual bull's-eye or central lenticular portion 7.

In the form of my invention shown in Figs. 1 and 2, the inner surface of the bull's-eye 7 is provided with a plurality of horizontal prisms 8, which prisms are so designed as to project a portion of the rays from the lamp A downwardly and to spread these rays vertically, as indicated by the dash lines 10. These downwardly deflected rays provide an indication to an observer close to the signal.

The prisms 8, as here shown, are moulded on the inner surface of the lens 3. As far as their optical features are concerned, these prisms could equally well be moulded on the outer surface of the lens 3, but they would then tend to collect dirt and would require frequent cleaning.

The form of my invention illustrated in Fig. 1 cannot be applied to an existing signal without replacing at least the outer lens 3 of the doublet C. To permit my invention to be applied to an existing signal without replacing this lens, the form of my invention illustrated in Figs. 3 and 4 may be used. Referring to these views, the outer lens 3 is of the usual form, in that the bull's-eye 7 is not provided with prisms. Interposed between the two lenses 2 and 3, however, is a prismatic screen $8^a$, the function of which is the same as the function of the prisms 8 in the forms illustrated in Figs. 1 and 2. This screen $8^a$ is mounted in a frustum-shaped tube 11, the outer end of which fits into the center step 5 of the outer end of lens 3, and the inner end of which tube fits into the center step 4 of the inner lens 2. In order to prevent the screen $8^a$ from turning in the tube 11 and the tube from turning in the lens, a plurality of strips of rubber 12 are interposed between the screen and the tube and between the tube and the outer lens 3. When the prismatic screen $8^a$ is pressed into the outer end of the tube these rubber strips will be compressed and so will prevent the screen from turning in the tube. Likewise, when the tube 11 is pressed into the center step of the lens 3, these rubber strips will be compressed between the tube and the lens and so will prevent the tube from turning.

The form of my invention, illustrated in Figs. 3 and 4, has one advantage over the form shown in Figs. 1 and 2, in that the prismatic screen $8^a$ may be turned slightly with respect to the lens, thereby throwing the close-up indication to either the right or the left of the signal, as desired, at the same time leaving the lens 3 in its original adjusted position with respect to the frame B.

In both forms of my invention the intensity of the main or distant indication given by the signal will be reduced approximately 15 or 20 per cent due to the downward deflection of the rays 10. One important feature of my invention, however, is the fact that the rays 10 for the close-up indication are taken from the center of the beam, so that as a train approaches the signal the main or distant indication is in the form of a circular beam at all points from which this indication is visible. In other words, the circular form of the main beam is not in any way sacrificed to provide for the close-up indication.

Although I have herein shown and described only two forms of light signals embodying my invention, it is understood that various changes and modifications may be made therein within the scope of the appended claims without departing from the spirit and scope of my invention.

Having thus described my invention, what I claim is:

1. In a railway light signal comprising a source of light and a doublet made up of two echelon lenses for projecting a beam of parallel rays from said source to a distant point, the combination therewith of a frustum-shaped tube the large end of which fits into the center step of the outer lens and the small end of which fits into the center step of the inner lens, and a prismatic screen mounted in said tube for projecting a portion of the rays from said source downwardly to provide an indication to an observer close to the signal.

2. In a railway light signal comprising a source of light and a doublet made up of two echelon lenses for projecting a beam of parallel rays from said source to a distant point, the combination therewith of a frustum-shaped tube the large end of which fits into the center step of the outer lens and the small end of which fits into the center step of the inner lens, a prismatic screen mounted in said tube for projecting a portion of the rays from said source downwardly to provide an indication to an observer close to the signal, and rubber clips associated with said tube and screen to prevent the screen from turning in the tube and the tube from turning in the lenses.

3. In a railway light signal comprising a source of light and a doublet made up of two echelon lenses for projecting a beam of parallel rays from said source to a distant point, the combination therewith of a tube located between and supported by said lenses, and a prismatic screen mounted in said tube for projecting a portion of the rays from said source downwardly to provide an indication to an observer close to the signal.

4. In a railway light signal comprising a source of light and a doublet made up of two echelon lenses for projecting a beam of parallel rays from said source to a distant point, the steps on the inner lens being on the outer surface thereof and the steps on the outer lens being on the inner surface thereof, the combination with the foregoing elements, of a tube one end of which fits into the center step of the inner lens and the other end of which fits into the center step of the outer lens, and a prismatic screen mounted in said tube for projecting a portion of the rays from said source downwardly to provide an indication to an observer close to the signal.

In testimony whereof I affix my signature.

WESLEY B. WELLS.